United States Patent
Hsu et al.

(10) Patent No.: US 7,230,886 B2
(45) Date of Patent: Jun. 12, 2007

(54) SPEED ERROR COMPENSATION METHOD FOR OPTICAL STORAGE DEVICE

(75) Inventors: Jen-Yu Hsu, Taipei (TW); Hsiang-Yi Fu, Taipei (TW); Tun-Chieh Lee, Taipei (TW); Fu-Hsiang Chen, Taipei (TW); Yao-Chou Tsai, Taipei (TW)

(73) Assignee: Lite-On IT Corporation, Taipei (TW)

( * ) Notice: Subject to any disclaimer, the term of this patent is extended or adjusted under 35 U.S.C. 154(b) by 707 days.

(21) Appl. No.: 10/692,602

(22) Filed: Oct. 24, 2003

(65) Prior Publication Data
US 2004/0090879 A1    May 13, 2004

(30) Foreign Application Priority Data
Nov. 1, 2002   (TW) ................. 91132408 A

(51) Int. Cl.
*G11B 21/08* (2006.01)
(52) U.S. Cl. ................................. 369/30.17
(58) Field of Classification Search ............ 369/30.17; 360/78.06
See application file for complete search history.

(56) References Cited

U.S. PATENT DOCUMENTS

| | | | | |
|---|---|---|---|---|
| 4,899,325 A | * | 2/1990 | Katsuhara et al. ........ | 369/30.16 |
| 5,046,058 A | * | 9/1991 | Shimonou ................ | 369/30.17 |
| 5,285,431 A | * | 2/1994 | Ogawa .................... | 369/30.15 |
| 5,351,222 A | * | 9/1994 | Ikeda et al. .............. | 369/30.17 |
| 5,398,221 A | * | 3/1995 | Ogawa .................... | 369/30.15 |

* cited by examiner

*Primary Examiner*—Tan Dinh
(74) *Attorney, Agent, or Firm*—Thomas, Kayden, Horstemeyer & Risley

(57) ABSTRACT

The present invention discloses a system for speed error compensation. A predetermined speed signal subtracts a feedback speed signal to generate a speed error signal, and a microprocessor receives the speed error signal and outputs a calculated result. A feedback controller receives the calculated result and generates a first tracking control effort signal. A feedforward controller receives the speed error signal and generates a second tracking control effort signal according to a DC steady state error in the speed error signal. An optical head module moves at an actual speed determined by the total of the first tracking control effort signal and the second tracking control effort signal. A gain controller generates the feedback speed signal according to an actual speed signal detecting from the actual speed.

12 Claims, 1 Drawing Sheet

SPEED ERROR COMPENSATION METHOD FOR OPTICAL STORAGE DEVICE

BACKGROUND OF THE INVENTION

1. Field of the Invention

The present invention relates to an optical storage device, and in particular to an optical storage device and method for accurate compensation of a speed error signal.

2. Description of the Related Art

FIG. 1 is a schematic diagram showing the architecture of a conventional speed control of an optical storage device according to the prior art. A predetermined speed signal is provided as a voltage signal. A comparison device 14 compares the predetermined speed signal and a feedback speed signal to generate a speed error signal, output to a microprocessor 17. The microprocessor 17 calculates the speed error signal, and then output a calculated result to a feedback controller 19. The feedback controller 19 generates a tracking control effort signal, output to an optical head module 12. The optical head module 12 is operated at an actual speed according to the tracking control effort signal. A measurement device 13 detects the actual speed and generates an actual speed signal. A gain controller 24 increases the actual speed signal to generate the feedback speed signal.

General speaking, a speed error signal comprises a DC steady state error (ess). In conventional speed control method, the DC steady state error can be easily eliminated by the microprocessor 17, because the DC steady state error always has the same value (ess+=ess−) in a horizontal orientation no matter the optical head module 12 increases or decreases the moving speed, wherein + indicates increased moving speed, and − indicates decreased moving speed, thereby the optical head module 12 is controlled effectively when in the horizontal orientation.

Moving inertia is affected in a non-horizontal orientation (for example, vertical orientation) when the optical head module 12 moves. For example, the moving speed is affected by gravitational force when the optical head module moves in different directions. As a result of gravitational force, the microprocessor 17 can not eliminate the DC steady state error because of the different DC steady state errors (ess+≠ess−) when the optical head module increases or decreases its moving speed. Thus, the feedback controller 19 generates the different tracking control efforts when the optical module increases and decreases its moving speed and the different tracking control efforts will lead to a tracking failure.

Moreover, as the demands of vertical type optical disk drive have increased, moving speed is affected by gravitation force, such that the optical head module 12 cannot shift precisely to a target track when the DC steady state error in the speed error signal is abnormal (ess+ or ess−), thereby the optical storage device is made to be further unstable and creating many potential problems, including increased seek time.

SUMMARY OF THE INVENTION

Accordingly, the invention provides a feedforward controller compensating a speed error signal when a DC steady state error is abnormal and a method for speed error compensation using the same.

The optical storage device according to present invention comprises a microprocessor, a feedforward controller, an optical head module and a gain controller.

The microprocessor receives a speed error signal and outputs a calculated result. A comparison device subtracts a feedback speed signal from a predetermined speed signal, generating a speed error signal. The feedback controller receives the calculated result and generates a first tracking control effort signal. The feedforward controller receives the speed error signal and generates a second tracking control effort signal according to a DC steady state error in the speed error signal. The optical head module moves at an actual speed determined by the total of the first tracking control effort signal and the second tracking control effort signal. The gain controller generates the feedback speed signal according to the actual speed signal detecting from the actual speed of the optical head module.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
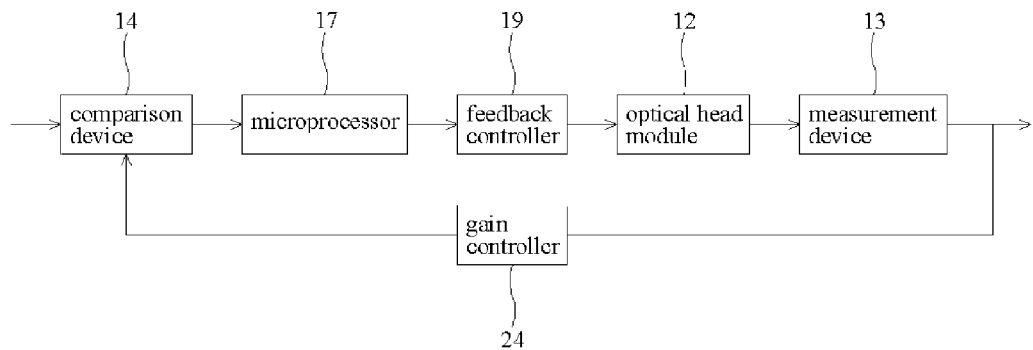
FIG. 1 is a schematic diagram showing the architecture of a conventional speed control of an optical storage device.
Figure 2:
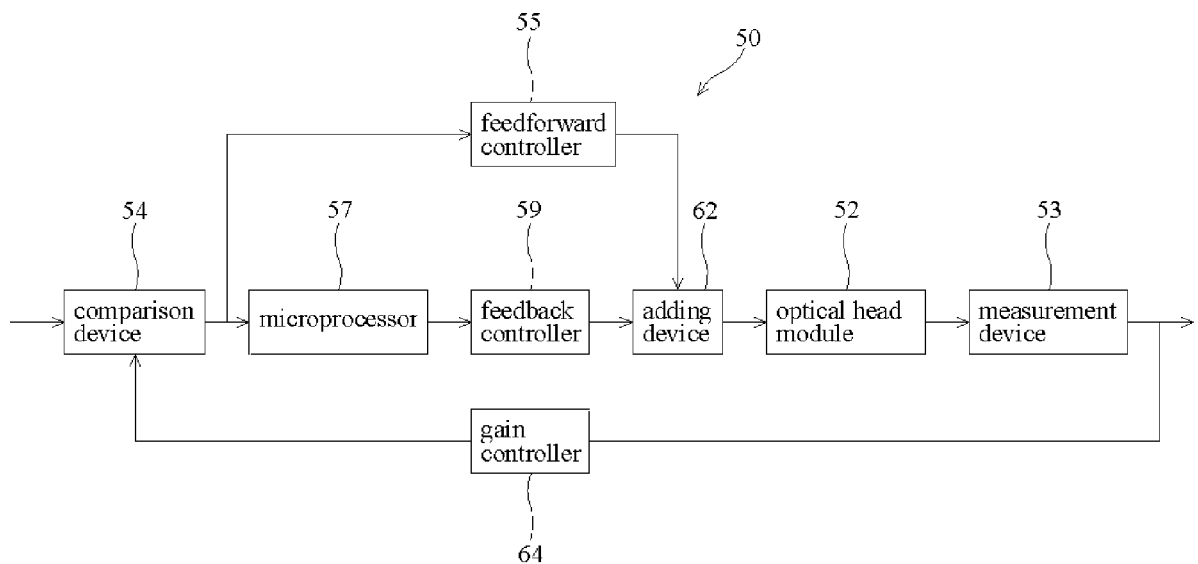
FIG. 2 is a schematic diagram showing the architecture of the speed control of the optical storage device according to the present invention.

FIG. 2 is a schematic diagram showing the architecture of the speed control of the optical storage device according to the present invention.

The present architecture of the speed control of the optical storage device comprises an optical head module 52, a measurement device 53, a comparison device 54, a feedforward controller 55, a microprocessor 57, a feedback controller 59, an adding device 62 and a gain controller 64.

The comparison device 54 subtracts a feedback speed signal from a predetermined speed signal to generate a speed error signal, output to the microprocessor 57 and the feedforward controller 55.

The microprocessor 57 receives the speed error signal and outputs a calculated result to the feedback controller 59. The feedback controller 59 calculates the calculated result and generates a first tracking control effort signal. Also, the feedforward controller 55 receives the speed error signal and generate a second tracking control effort signal according to the DC steady state error of the speed error signal. In this way, the feedforward controller 55 continuously outputs a second tracking control effort signal to the adding device 62 to compensate the first tracking control effort signal until the DC steady state error reaches a normal value. The adding device 62 calculates the total of the first tracking control effort signal and the second signal, output to the optical head module 52. In the present embodiment, the first tracking control effort signal and the second tracking control effort signal are voltage signals.

The optical head module 52 tracks at an actual speed determined by the total of the first tracking control effort signal and the second speed control signal.

The measurement device 53 detects an actual speed of the optical head module 52 and outputs an actual speed signal to the gain controller 64.

The gain controller 64 generates the feedback speed signal according to increased the actual speed signal, output to the comparison device 54.

For example, when the predetermined speed signal is higher than the feedback speed signal, the speed error signal is positive. At this time, when the DC steady state error exceeds a normal value, it means that the moving speed of the optical head module 52 is slower and the feedforward controller 55 should generate a positive second tracking control effort signal to increase the moving speed of the optical head module 52 for lowing the DC steady state error to a normal value. Or, when the DC steady state error is less than the normal value, it means that the moving speed of the optical head module 52 is faster and the feedforward controller 55 should generate a negative second tracking control effort signal to decrease the moving speed of the optical head module 52 for increasing the DC steady state error to a normal value.

For another example, when the predetermined speed signal is smaller than the feedback speed signal, the speed error signal is negative. At this time, when the DC steady state error exceeds a normal value, it means that the moving speed of the optical head module 52 is faster and the feedforward controller 55 should generate a negative second tracking control effort signal to decrease the moving speed of the optical head module 52 for lowing the DC steady state error to a normal value. Or, when the DC steady state error is less than the normal value, it means that the moving speed of the optical head module 52 is slower and the feedforward controller 55 should generate a positive second tracking control effort signal to increase the moving speed of the optical head module 52 for increasing the DC steady state error to a normal value.

When the DC steady state error maintains at the normal value, the DC steady state error can be easily eliminated by the microprocessor 57. In the vertical orientation, the feedforward controller 55 is designed to compensate the first control effort signal, so as to prevent the abnormal DC steady state error.

In the present invention, the feedforward controller 55 receives the speed error signal and continuously outputs the second tracking control effort signal to compensate the first tracking control effort signal to adjust the actual speed of the optical head module 52. In this way, the DC steady state error of the speed error signal can be maintained at a normal value when vertical orientation.

In the present invention, the feedforward controller 55 and the feedback controller 59 can be implemented by using a firmware programming a control chip.

The present invention provides an optical storage device and a method for speed error compensation therein. The feedforward controller monitors speed error signal and outputs a second tracking control effort signal to adjust the actual speed, such that the optical head module is controlled more effectively when in a vertical orientation.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for optical storage device speed error compensation, comprising:
    a circuit for receiving an speed error signal and outputting a first tracking control effort signal;
    a feedforward controller for receiving the speed error signal and generating a second tracking control effort signal according to a DC steady state error in the speed error signal;
    an optical head module for moving at an actual speed determined by the total of the first tracking control effort signal and the second tracking control effort signal;
    a gain controller for generating a feedback speed signal according to the actual speed of the optical head module; and
    a comparison device subtracting the feedback speed signal from a predetermined speed signal to generate the speed error signal.

2. The system as claimed in claim 1, wherein the circuit comprises a microprocessor generating a calculated result according to the speed error signal, and a feedback controller receiving the calculated result and outputs the first tracking control effort signal.

3. The system as claimed in claim 1, wherein the feedforward controller continuously generates the second tracking control effort signal to adjust the DC steady state error to a threshold value.

4. The system as claimed in claim 1, wherein the feedforward controller and the feedback controller are implemented by using a firmware programming a control chip.

5. The system as claimed in claim 1, wherein the optical head module is inclined orientation.

6. The system as claimed in claim 1, wherein a measurement device detects the actual speed and outputs the actual speed signal to the gain controller.

7. The system as claimed in claim 1, wherein the first tracking control effort signal and the second speed control signal are voltage signals.

8. A method for speed error compensation, comprising the steps of:
    detecting an actual speed of an optical head module and outputting an actual speed signal;
    obtaining a feedback speed signal by gaining the actual speed signal;
    generating a speed error signal by subtracting the feedback speed signal from a predetermined speed signal;
    calculating the speed error signal and outputting a first tracking control effort signal;
    calculating a DC steady state error in the speed error signal and outputting a second tracking control effort signal; and
    adjusting the actual speed of the optical head module according to the total of the first tracking control effort signal and the second tracking control effort signal;
    wherein the second tracking control effort signal is continuously generated until the DC steady state error reaches a threshold value.

9. The method as claimed in claim 8, wherein when the speed error signal is positive and the DC steady state error exceeds the threshold value, the total of the first tracking control effort signal and the second tracking control effort signal increases the actual speed of the optical head module.

10. The method as claimed in claim 8, wherein when the speed error signal is positive and the DC steady state error is lower than the threshold value, the total of the first tracking control effort signal and the second tracking control effort signal decreases the actual speed of the optical head module.

11. The method as claimed in claim 8, wherein when the speed error signal is negative and the DC steady state error exceeds the threshold value, the total of the first tracking control effort signal and the second tracking control effort signal decreases the actual speed of the optical head module.

12. The method as claimed in claim 8, wherein when the speed error signal is negative and the DC steady state error is lower than the threshold value, the total of the first tracking control effort signal and the second tracking control effort signal increases the actual speed of the optical head module.

* * * * *